2,944,935
PARASITICIDE COMPOSITION OF REDUCED PHYTOTOXICITY

Oscar H. Hammer, Midland, Mich., assignor to The Dow Chemical Company, Midland, Mich., a corporation of Delaware No Drawing. Filed Nov. 28, 1958, Ser. No. 776,726

2 Claims. (Cl. 167—30)

This invention relates to parasiticide compositions, and is particularly directed to a composition of reduced phytotoxicity, and to a method for reducing the phytotoxicity of parasiticidal toxicants frequently injurious to plants and plant parts.

Chlorophenyl esters of benzenesulfonic acids including 4-chlorophenyl 4-chlorobenzenesulfonate, 2,4-dichlorophenyl benzenesulfonate and p-chlorophenyl benzenesulfonate have been widely employed as ingredient of parasiticidal compositions particularly for the control of mite and spider mite organisms which attack many varieties of plants including fruit trees such as apple, sweet and sour cherry, pear, peach, plum, prune, quince and citrus; nut trees such as walnut; small fruit plants such as raspberry, strawberry and currants; ornamental trees such as spruce, dogwood and maple; cotton plants; flowering shrubs such as roses; beans and certain other vegetable plants. These sulfonate esters have been found almost specific for mite and spider mite eggs and compositions comprising the chlorophenyl esters of benzenesulfonic acids have been accepted as arachnicides in commercial practice. However, under certain conditions of moisture and season, the sulfonates have been found to be somewhat phytotoxic to certain plants and plant parts, particularly to black raspberry foliage and canes, to fruits of pear and apple, to leaves of maple and dogwood, and cotton. This phytotoxic effect generally manifests itself in chlorosis, russeting and necrotic blackening of plant and plant parts, rendering them inferior for commercial use and sale and/or destroying their aesthetic effect.

It is an object of the present invention to provide an improved parasiticidal composition comprising a chlorophenyl ester of a benzenesulfonic acid as an active toxic ingredient. It is a further object to provide an improved parasiticide composition comprising a 4-chlorophenyl 4-chlorobenzenesulfonate as an active toxic ingredient. It is a still further object to provide a composition which will be non-phytotoxic or less phytotoxic than existing compositions which include a parasiticidal concentration of a chlorophenyl ester of a benzenesulfonic acid. A still further object is to supply a method for safening or rendering less phytotoxic aqueous dispersions of the 4-chlorophenyl 4-chlorobenzenesulfonate. Other objects will become evident from the following specification and claims.

In accordance with the present invention, it is found that the phytotoxic properties of chlorophenyl esters of benzenesulfonic acids such as 4-chlorophenyl 4-chlorobenzenesulfonate, 2,4-dichlorophenyl benzenesulfonate and p-chlorophenyl benzenesulfonate may be materially reduced if the sulfonate ester be employed in combination with diphenylamine. These esters are characterized by the structure

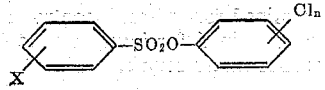

wherein X is hydrogen or chlorine and $n$ is 1 or 2. The diphenylamine in some way acts to reduce the phytotoxic effect of the sulfonate so that by incorporating diphenylamine in a parasiticidal composition comprising chlorophenyl esters of benzenesulfonic acids an improved composition is obtained. Such composition when applied to plants protects the plants from infestation by mites and spider mites without inflicting thereto harmful and undesirable side effects. This improved method and composition for the control of mite and spider mites is applicable in any procedure employing the parasiticidal chlorophenyl esters of benzenesulfonic acids. In the preferred embodiment of this invention, the improved parasiticide composition comprises 4-chlorophenyl 4-chlorobenzenesulfonate and diphenylamine. In the preferred practice of this invention, aqueous dispersions of the improved composition comprising a chlorophenyl ester of a benzenesulfonic acid and diphenylamine are applied to plants and plant parts. In the improved composition, the sulfonate ester is employed in any operable acaricidal amount and the diphenylamine in any amount sufficient to render the sulfonate ester less phytotoxic to plants. The desirable amount of diphenylamine employed for a given amount of the sulfonate ester may vary with factors such as conditions of moisture, season, type of formulation, e.g. emulsifiable concentrate or wettable powder, method of application, etc. Generally, however, a ratio of from 0.05 to 1 part by weight of diphenylamine for each part of sulfonate ester is found to be satisfactory. While any ratio within the above range is found to reduce the phytotoxicity of the sulfonate esters, best results have been found to be obtained when the ratio is approximately 1:1. An excess of diphenylamine may be employed, however, generally no advantage therein has been observed. The components of these parasiticidal compositions are associated with a carrier such as a finely divided powder, a solvent liquid of organic origin, a wetting and dispersing agent or a suitable combination of any of these. In such formulation, the sulfonate toxicant and diphenylamine may be present in relatively high concentrations to provide a concentrate adapted for further dilution into spray or dust compositions, or they may be in dilute form adapted for application as spray or dust without further modification.

In a concentrate composition, the amount of the appropriate chlorophenyl sulfonate may vary from 5 to 95 parts by weight. In such concentrate compositions, the sulfonate toxicant and diphenylamine are diluted with dispersing, emulsifying and wetting agents, finely divided carrier, solvents, and other suitable inert ingredients. Suitable wetting and dispersing agents include dioctyl sodium sulfosuccinate (Aerosol OT), sodium lauryl sulfate, alkyl aryl sulfonate (Nacconol NR), alkylated aryl polyether alcohol (Triton X-100), polyoxyethylene sorbitol oleate-laurate (Atlox 1045A), and polyoxyethylene derivative of sorbitan trioleate (Tween 85). Operable carriers include volcanic ash, diatomaceous earth, pyrophyllite, attapulgite, talc, wood flour and the like. Suitable solvent liquids include xylene, toluene, alcohols, petroleum distillates, liquid chlorinated hydrocarbons, pine oils, glycerides and the like. Other conventional additaments may be employed provided only that such agent accomplish the end desired and not be reactive with the other ingredients of the composition so as to reduce their effectiveness.

Preferred concentrate compositions are wettable powders and emulsifiable concentrates. Wettable powders may be prepared by blending or otherwise mixing together a chlorophenyl ester of a benzenesulfonic acid, diphenylamine, a wetting and/or dispersing agent and other components, and then grinding the mixture in a hammermill. In such compositions, the amount of the sulfonate may vary from 5 to 95 parts by weight. In a preferred composition, the sulfonate is employed in an amount of from 5 to 75 parts by weight of the total composition, the diphenylamine in the desired ratio of the sulfonate, the wetting and/or dispersing agent in an amount of from 1 to 5 parts by weight of the total composition and an inert solid carrier constituting the remainder of the composition.

Emulsifiable concentrates may be prepared by mixing together a chlorophenyl ester of a benzenesulfonic acid, diphenylamine, dispersing and/or emulsifying agent, and liquid carrier until a homogeneous mixture is obtained. In a preferred composition, the amount of sulfonate ester varies from 10 to 50 percent by weight, the diphenylamine in the desired ratio, the emulsifying agent from 5 to 20 percent by weight and an organic solvent carrier constituting the remainder of the composition.

Wettable powders or emulsifiable concentrates as above described are suitable for dispersing in water to provide aqueous spray compositions. Any compatible wetting, dispersing or emulsifying agents such as those previously described or hereinafter disclosed may be employed in the spray compositions.

In a preferred embodiment of the present invention, plants are treated with an aqueous spray composition prepared by dispersing the wettable powder or emulsifiable concentrate in water. In spray compositions, the concentrate of the employed sulfonate esters is generally from 2 ounces to 32 ounces per 100 gallons of ultimate dispersion. Preferred compositions contain from 4 to 12 ounces per 100 gallons. These compositions are applied to plant and plant parts by methods well known to those skilled in the art. Compositions comprising 4-chlorophenyl 4-chlorobenzenesulfonate and diphenylamine have been found to be particularly effective.

The following examples illustrate the invention but are not to be construed as limiting.

EXAMPLE 1

Emulsifiable concentrates were prepared by mixing together 4-chlorophenyl 4-chlorobenzenesulfonate and/or diphenylamine, Toximul 500 (anionic non-ionic blended emulsifier) and xylene (flash point, 100° C.), until a homogeneous solution was obtained. The compositions of the concentrates were as follows:

Composition I:   Parts by weight
    4-chlorophenyl 4-chlorobenzenesulfonate ____ 12.6
    Diphenylamine _____ 12.6
    Toximul 500 _____ 6.3
    Xylene _____ 68.5
Composition II:
    4-chlorophenyl 4-chlorobenzenesulfonate ____ 24.6
    Toximul 500 _____ 6.2
    Xylene _____ 69.2
Composition III:
    Diphenylamine _____ 25.8
    Toximul 500 _____ 6.5
    Xylene _____ 67.7

The concentrate compositions were dispersed in water to obtain spray compositions containing 8 ounces of 4-chlorophneyl 4-chlorobenzenesulfonate per 100 gallons of aqueous spray composition and/or 8 ounces of diphenylamine per 100 gallons of spray composition. The spray compositions A, B and C correspond to that prepared from concentrate compositions I, II and III, respectively. These compositions were sprayed to the point of run off to apple trees bearing fruit of the Jonathan and Golden Delicious varieties heavily infested with eggs and active forms of European red mite. The first application was made on August 1 and thereafter at about two-week intervals. The fruit at the time of the first application was about half grown, a size of approximately 1½ to 2 inches in diameter. After application, the apples on the trees were examined periodically both at the stem ends and on the cheeks for necrotic spots and other injury due to 4-chlorophenyl 4-chlorobenzenesulfonate and for extent of control against European red mite. Check plants received no treatment and provided continuous source of infestation. The injury on the fruit of apples manifests itself in russeting and necrosis in the form of blackened spots which vary in size from that of a pinhead to an inch or more in diameter. However, since even a small injury renders fruit of inferior quality in use or sale, examination for injury due to spraying was made without regard to the extent of injury for each fruit.

*Table I*

| Composition | Concentration in Ounces/ 100 Gallons of Spray | | Interval After 1st Application (Days) | Mite Control (Percent) | Interval After 2nd Application (Days) | Mite Control (Percent) | Percent Fruit Totally Uninjured at Time of Harvest | |
|---|---|---|---|---|---|---|---|---|
| | 4-Chlorophenyl 4-Chlorobenzenesulfonate | Diphenylamine | | | | | Stem End | Cheek |
| A | 8 | 8 | 8 | 70.0 | 3 | 96.0 | 100.0 | 82.0 |
| B | 8 | 0 | 8 | 85.0 | 3 | 96.0 | 69.0 | 27.0 |
| C | 0 | 8 | 8 | 0.0 | 3 | 0.0 | 100.0 | 100.0 |
| Check | 0 | 0 | 8 | None | 3 | None | 100.0 | 100.0 |

EXAMPLE 2

A wettable powder having the composition set forth below (composition IV) was prepared by mixing together 4-chlorophenyl 4-chlorobenzenesulfonate and diphenylamine, Nacconol NR (alkyl aryl sulfonate), Daxad 27 (sodium aryl alkyl sulfonic acid product), and finely divided inert solid carrier and hammermilling the blended mixture to obtain a free-flowing powder.

Composition IV:   Parts by weight
    4-chlorophenyl 4-chlorobenzenesulfonate ____ 25.0
    Diphenylamine _____ 25.0
    Nacconol NR _____ 1.0
    Daxad 27 _____ 2.0
    Attapulgite clay _____ 47.0

The wettable powder was dispersed in water to obtain a spray composition (composition D) containing 8 ounces of chemical (4-chlorophenyl 4-chlorobenzenesulfonate plus diphenylamine) per 100 gallons of aqueous spray composition. This composition was sprayed on apple trees bearing half grown fruit of Jonathan and Golden Delicious varieties and heavily infested with European red mites and their eggs. The first application was made on August 1 and thereafter sprayed at about two-week intervals. As checks other fruit bearing trees were left without treatment. At intervals after application, the plants were examined for red mite control and at harvest the fruits were examined for injury due to the 4-chlorophenyl 4-chlorobenzenesulfonate.

Table II

| Composition | Interval After 1st Application (Days) | Mite Control (Percent) | Interval After 2nd Application (Days) | Mite Control (Percent) | Interval After 3rd Application (Days) | Mite Control (Percent) | Percent of Fruit Totally Uninjured at Harvest | |
|---|---|---|---|---|---|---|---|---|
| | | | | | | | Stem End | Cheek |
| D | 8 | 70.0 | 3 | 99.1 | 15 | 97.6 | 99.7 | 100.0 |
| Check | 8 | None | 3 | None | 15 | None | 100.0 | 100.0 |

EXAMPLE 3

Wettable powder compositions containing varying ratios of 4-chlorophenyl 4-chlorobenzenesulfonate and diphenylamine were prepared as follows:

Composition V:                            Parts by weight
4-chlorophenyl 4-chlorobenzene sulfonate ____ 42.8
Diphenylamine _____ 14.3
Nacconol NR _____  0.9
Daxad 27 _____  1.7
Attapulgite clay _____ 40.3

Composition VI:
4-chlorophenyl 4-chlorobenzene-sulfonate ____ 33.4
Diphenylamine _____ 33.3
Nacconol NR _____  0.7
Daxad 27 _____  1.3
Attapulgite clay _____ 31.3

Composition VII:
4-chlorophenyl 4-chlorobenzene-sulfonate ____ 50.0
Nacconol NR _____  1.0
Daxad 27 _____  2.0
Attapulgite clay _____ 47.0

Compositions V, VI and VII were dispersed in water to obtain spray compositions E, F and G each containing 227 grams of 4-chlorophenyl 4-chlorobenzenesulfonate and 75.7 grams, 227 grams and 0 grams, respectively, of diphenylamine per 100 gallons of aqueous composition. These compositions were sprayed onto pear trees in two applications at 10-day intervals and examined 18 days after the first application for russet and necrotic spots resulting from chemical injury to the fruit. Check plants received no treatment. It was found that the fruits treated with the composition containing 4-chlorophenyl 4-chlorobenzenesulfonate with no added diphenylamine were severely injured, the injury manifesting itself in numerous large necrotic spots whereas the fruits treated with the 4-chlorophenyl 4-chlorobenzenesulfonate composition containing diphenylamine were essentially uninjured. The results are summarized in the following table:

Table III

| Composition | Results |
|---|---|
| E | 93 percent totally uninjured; 7 percent mild injury. |
| F | 95 percent totally uninjured; 5 percent mild injury. |
| G | 76 percent totally uninjured; 24 percent severe injury. |
| Check | 100 percent totally uninjured. |

EXAMPLE 4

Compositions F and G of Example 3 were sprayed on black raspberry plants growing in field plots. Two weeks after application, the plants were examined for phytotoxic injury manifested by blackening and atrophying of leaves, canes and stem tips. Since injury to any part of a plant renders the plant unfit for sale or use as a slip for growing a new plant, and further since the size and quality of the fruit is dependent on a healthy plant, examination for injury was made without regard to extent of injury. The results were as follows:

Table IV

| Composition | Percent Uninjured |
|---|---|
| F (containing diphenylamine) | 88 |
| G (containing no diphenylamine) | 19 |
| Check | 100 |

EXAMPLE 5

A wettable powder composition is prepared as follows:

Parts by weight
4-chlorophenyl 4-chlorobenzenesulfonate _____ 47.6
Diphenylamine _____  4.8
Nacconol NR _____  1.0
Daxad 27 _____  1.9
Attapulgite clay _____ 44.7

This composition is dispersed in water to provide a spray composition containing 6 ounces of the sulfonate per 100 gallons of ultimate dispersion. Such composition is applied as a spray for the control of mite infestation on ornamental trees. The foliage of the sprayed trees remains green and lush and free from chemical injury and from defoliation due to high mite population.

EXAMPLE 6

An emulsifiable concentrate composition is prepared as described in composition 1 in Example 1. This composition is dispersed in water to provide a spray composition containing 20 ounces of sulfonate toxicant per 100 gallons of aqueous dispersion. This composition is sprayed on apple trees of the Red Delicious variety infested with eggs of both two-spotted spider mite and European red mite to obtain good controls therewith without injury to the fruits.

EXAMPLE 7

A dust composition suitable for application on berry plants is prepared by intimately blending and hammer-milling together Parts by weight
4-chlorophenyl 4-chlorobenzenesulfonate _____ 10
Diphenylamine _____ 10
Attapulgite clay _____ 80

EXAMPLE 8

Concentrate compositions are prepared as follows:

(A) 47.6 parts by weight of 4-chlorophenyl 4-chlorobenzenesulfonate, 2.4 parts by weight of diphenylamine, 0.9 part by weight of Nacconol NR, 1.7 parts by weight of Daxad 27 and 47.1 parts of attapulgite clay are mechanically mixed to obtain a water-dispersible mixture.

(B) 12.6 parts by weight of 4-chlorophenyl 4-chlorobenzenesulfonate, 12.6 parts by weight of diphenylamine, 6.3 parts by weight of Agrimul 70A (polyoxyethylene ether of an alkylated phenol) and 68.5 parts by weight of xylene are blended together to obtain an emulsifiable liquid composition.

These compositions may be dispersed in water to produce aqueous compositions having desirable wetting properties. The aqueous compositions are sprayed on trees and other plants to control infestation of mites with substantially no injury to the plants.

EXAMPLE 9

Concentrate compositions are prepared as follows:

(A) 25 parts by weight of 2,4-dichlorophenyl benzenesulfonate, 25 parts by weight of diphenylamine, 0.5 part by weight of Nacconol NR, 1 part by weight of Daxad 27 and 48.5 parts by weight of attapulgite clay are mechanically mixed together to obtain a water-dispersible mixture.

(B) 12.6 parts by weight 2,4-dichlorophenyl benzenesulfonate, 12.6 parts by weight of diphenylamine, 6.3 parts by weight of Agrimul 70A and 68.5 parts by weight of xylene are blended together to obtain an emulsifiable liquid composition.

These compositions may be dispersed in water to produce aqueous spray compositions adapted to be employed for applying to foliage of fruit trees in a manner described in Examples 1 and 2 for the control of mite and mite eggs with substantially no injury to plants.

EXAMPLE 10

The following concentrate compositions are prepared in a similar manner.

(A) 25 parts by weight of p-chlorophenyl benzenesulfonate, 25 parts by weight of diphenylamine, 0.5 part by weight of Nacconol NR, 1 part by weight of Daxad 27 and 48.5 parts by weight of attapulgite clay are mechanically mixed together to obtain a water-dispersible mixture.

(B) 12.6 parts by weight of p-chlorophenyl benzenesulfonate, 12.6 parts by weight of diphenylamine, 6.3 parts by weight of Agrimul 70A and 68.5 parts by weight of xylene are blended together to obtain an emulsifiable liquid composition.

These compositions may be dispersed in water to produce aqueous spray compositions adapted to be employed for applying to plant foliage. Such compositions when employed in accordance with the teachings of the present application control mite and mite egg infestation with substantially no injury to the plants.

This application is a continuation-in-part of my copending application Serial No. 669,964, filed July 5, 1957, now abandoned.

I claim:

1. A parasiticide composition comprising (1) a chlorophenyl ester of a benzenesulfonic acid said ester being characterized by the structure

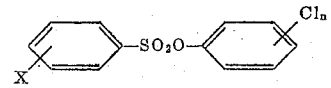

wherein X is selected from the group consisting of hydrogen and chlorine and $n$ is an integer of from 1 to 2, inclusive, and (2) diphenylamine wherein the amine is present in an amount of at least 0.05 to about 1 part by weight based on the weight of sulfonic acid ester.

2. A parasiticide composition comprising (1) 4-chlorophenyl 4-chlorobenzenesulfonate and (2) diphenylamine wherein the amine is present in an amount of at least 0.05 to about 1 part by weight based on the weight of 4-chlorophenyl 4-chlorobenzenesulfonate.

References Cited in the file of this patent

UNITED STATES PATENTS 2,538,728   Kenaga ---------------- Jan. 16, 1951

FOREIGN PATENTS 663,137   Great Britain ------------ Aug. 23, 1949

OTHER REFERENCES

King: U.S.D.A. Handbook No. 69, May 1954, p. 155.